United States Patent
Zhou et al.

(10) Patent No.: US 12,494,984 B2
(45) Date of Patent: Dec. 9, 2025

(54) METHOD FOR ACQUIRING NETWORK TOPOLOGY AND INDOOR DISTRIBUTION SYSTEM

(71) Applicant: COMBA NETWORK SYSTEMS COMPANY LIMITED, Guangdong (CN)

(72) Inventors: Jinqing Zhou, Guangdong (CN); Manjiang Luo, Guangdong (CN); Shaohu Fang, Guangdong (CN); Quan Lai, Guangdong (CN); Xin Li, Guangdong (CN)

(73) Assignee: COMBA NETWORK SYSTEMS COMPANY LIMITED, Guangzhou (CN)

( * ) Notice: Subject to any disclaimer, the term of this patent is extended or adjusted under 35 U.S.C. 154(b) by 383 days.

(21) Appl. No.: 18/275,419

(22) PCT Filed: Dec. 8, 2021

(86) PCT No.: PCT/CN2021/136505
§ 371 (c)(1),
(2) Date: Aug. 2, 2023

(87) PCT Pub. No.: WO2022/166393
PCT Pub. Date: Aug. 11, 2022

(65) Prior Publication Data
US 2024/0106732 A1    Mar. 28, 2024

(30) Foreign Application Priority Data
Feb. 2, 2021 (CN) .................. 202110145958.X

(51) Int. Cl.
*H04L 45/02*    (2022.01)
*H04L 41/0677*   (2022.01)
(Continued)

(52) U.S. Cl.
CPC .......... *H04L 45/02* (2013.01); *H04L 41/0677* (2013.01); *H04W 4/02* (2013.01); *H04W 4/33* (2018.02); *H04W 24/04* (2013.01)

(58) Field of Classification Search
CPC ..... H04L 45/02; H04L 41/0677; H04L 41/12; H04W 4/02; H04W 4/33; H04W 24/04; H04W 40/02
See application file for complete search history.

(56) References Cited

U.S. PATENT DOCUMENTS

| 11,923,905 B2 * | 3/2024 | Luo ................. H04B 10/07955 |
| 2003/0052726 A1 * | 3/2003 | Shkap ..................... G06G 7/24 |
| | | 327/350 |

(Continued)

FOREIGN PATENT DOCUMENTS

| CN | 103384385 A | 11/2013 |
| CN | 103795573 A | 5/2014 |

(Continued)

OTHER PUBLICATIONS

International Search Report of PCT Patent Application No. PCT/CN2021/136505 issued on Feb. 23, 2022.

(Continued)

*Primary Examiner* — Lan-Huong Truong

(57) ABSTRACT

The present disclosure provides a method for acquiring a network topology and an indoor distribution system. The method comprises: a host unit receives position information transmitted by each extended unit connected to the host unit, and determines a network topology structure according to the position information. In this way, the labor cost can be reduced. In addition, the network topology structure obtained by the method provided by the present disclosure has higher accuracy, so that position information of each (Continued)

node can be learnt at a host unit, the fault can be quickly located, and the system operation and maintenance cost is reduced.

16 Claims, 9 Drawing Sheets

(51) Int. Cl.
*H04W 4/02* (2018.01)
*H04W 4/33* (2018.01)
*H04W 24/04* (2009.01)

(56) References Cited

U.S. PATENT DOCUMENTS

2012/0027145 A1* 2/2012 Uyehara ............... H04J 3/0685
                                                         375/356
2012/0281565 A1   11/2012 Sauer
2016/0345259 A1* 11/2016 Heidler ............. H04W 52/0206

FOREIGN PATENT DOCUMENTS

| CN | 105227373 A | 1/2016 |
| CN | 108770009 A | 11/2018 |
| CN | 108809445 A | 11/2018 |
| CN | 110278572 A | 9/2019 |
| CN | 111030296 A | 4/2020 |
| WO | 2020258735 A1 | 12/2020 |

\* cited by examiner

METHOD FOR ACQUIRING NETWORK TOPOLOGY AND INDOOR DISTRIBUTION SYSTEM

The present disclosure is a national stage application of PCT international application No. PCT/CN2021/136505 filed on Dec. 8, 2021, which claims priority to Chinese Patent Application No. 202110145958X, filed with the China Patent Office on Feb. 2, 2021, and entitled "METHOD FOR ACQUIRING NETWORK TOPOLOGY AND INDOOR DISTRIBUTION SYSTEM", the entire content of which is incorporated herein in its entirety.

TECHNICAL FIELD

The present disclosure relates to the field of communication technologies, and in particular, to a method for acquiring a network topology and an indoor distribution system.

BACKGROUND

In a method for acquiring a network topology of an indoor distribution system, there is a need to record deployment information of nodes in the indoor distribution system one by one, and then a technician manually configures network topology information at a centralized control position. However, this method leads to a high labor cost.

SUMMARY

In a first aspect, the present disclosure provides a method for acquiring a network topology, the method being applied to an indoor distribution system. The indoor distribution system includes a host unit, the host unit is connected to at least one branch of extended unit. Each branch of extended unit includes at least one extended unit. Extended units in a same branch of extended unit are successively cascaded. Part or all of the extended units in each branch of extended unit are respectively connected to at least one radio frequency subsystem, and each radio frequency subsystem includes at least one remote unit.

The method for acquiring a network topology including:
  receiving, by the host unit, position information transmitted by each extended unit connected to the host unit, the position information transmitted by each extended unit connected to the host unit includes: first-level information respectively corresponding to all extended units in a branch where the extended unit connected to the host unit is located, and second-level information respectively corresponding to part or all of the extended units in the branch where the extended unit connected to the host unit is located, the second-level information including gain control values of remote units in the at least one radio frequency subsystem connected to the extended unit; and
  determining, by the host unit, a network topology structure according to the position information transmitted by each extended unit connected to the host unit.

In a second aspect, the present disclosure provides an indoor distribution system, including: a host unit, the host unit being connected to at least one branch of extended unit. Each branch of extended unit includes at least one extended unit. Extended units in a same branch of extended unit are successively cascaded. Part or all of the extended units in each branch of extended unit are respectively connected to at least one radio frequency subsystem. Each radio frequency subsystem includes at least one remote unit. The indoor distribution system is configured to implement the method for acquiring a network topology as described above.

DETAILED DESCRIPTION OF THE EMBODIMENTS

In order to better understand the above objectives, features, and advantages of the present disclosure, the solutions of the present disclosure will be further described below. It is to be noted that, in the case of no conflict, embodiments of the present disclosure and the features in the embodiments can be combined with each other.

Figure 1:
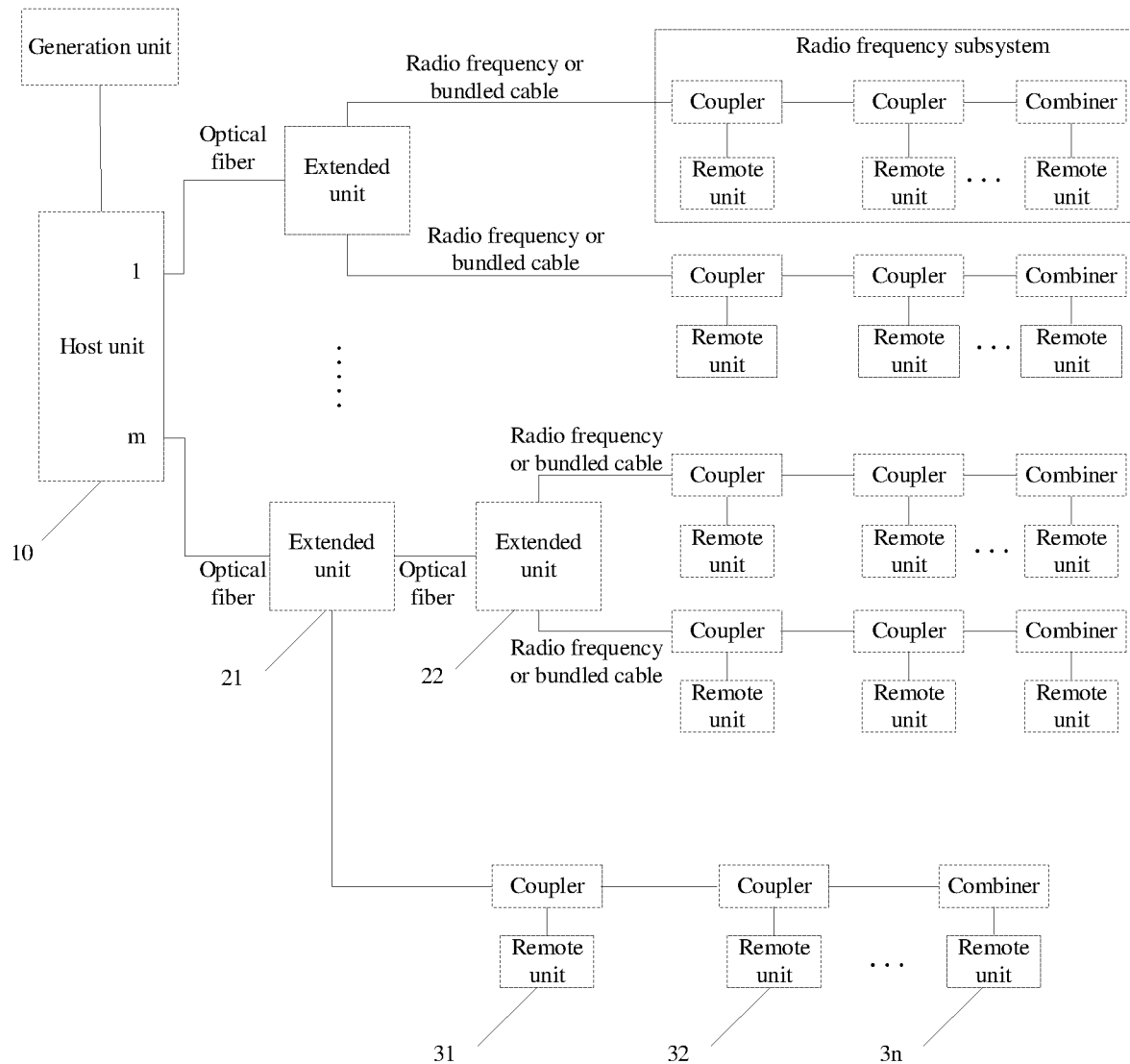
FIG. 1 is a schematic structural diagram of an indoor distribution system according to an embodiment of the present disclosure.

FIG. 1 is a schematic structural diagram of an indoor distribution system according to an embodiment of the present disclosure. As shown in FIG. 1, the indoor distribution system includes a host unit 10. The host unit 10 is connected to at least one branch of extended unit (e.g., an extended unit 21 and an extended unit 22 illustrated in FIG. 1). Each branch of extended unit includes at least one extended unit, and extended units in a same branch of extended unit are successively cascaded. Part or all of the extended units in each branch of extended unit are respectively connected to at least one radio frequency subsystem, and each radio frequency subsystem includes at least one remote unit. For example, the radio frequency subsystem connected to the extended unit 21 illustrated in FIG. 1 includes a remote unit 31, a remote unit 32, . . . , and a remote unit 3$n$.

The host unit and the extended unit may be connected through an optical fiber, the extended units in each branch of extended unit may be connected through an optical fiber, and the extended unit and the remote unit may be connected through a radio frequency cable, a bundled feeder, or the like.

There may be a multi-stage star connection topology structure between the host unit and the extended units, and there may be a multi-stage cascaded topology structure between the extended units. The extended unit connects a plurality of remote units in cascade through a combiner or a coupler.

The host unit is configured for backhaul, communication protocol processing (such as 4G and 5G protocols), baseband processing, or radio-frequency coupling, etc.

The extended unit is configured for data distribution and aggregation, digital-to-analog and analog-to-digital interface conversion, and the like.

The remote unit is configured to control the gain of a radio-frequency processing device included in the remote unit so that the output power of the remote unit is a target power. The remote unit may be further configured to amplify a radio-frequency signal.

Figure 2:
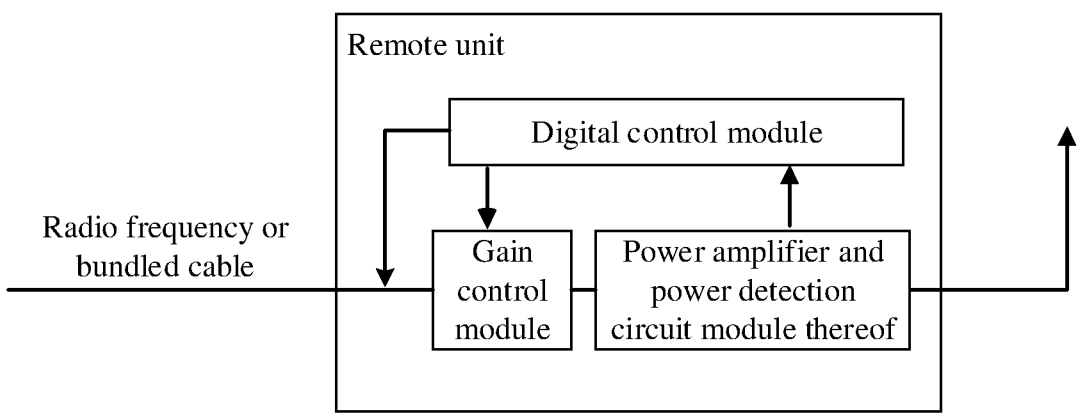
FIG. 2 is a schematic structural diagram of a remote unit according to an embodiment of the present disclosure.

Further, FIG. 2 is a schematic structural diagram of a remote unit according to an embodiment of the present disclosure. As shown in FIG. 2, the remote unit includes a gain control module (ATT), a power amplifier and a power detection circuit module (PAM) thereof, and a digital control module (DCM).

The DCM communicates with the extended unit through a wired or wireless transmission medium by using a first communication protocol. The transmission medium may include, but is not limited to, radio frequency, a bundled cable, a wireless propagation environment, and the like. The transmission medium is not limited in the present disclosure. The first communication protocol may include, but is not limited to, Bluetooth, for example, protocols such as a Bluetooth Low Energy (BLE) protocol, a ZigBee Technology protocol, and a General packet radio service (GPRS) protocol.

The PAM is configured to detect output power of an antenna port, and compare whether the detected output power is consistent with a target power value. If the PAM detects that the output power is inconsistent with the target power, a control message is transmitted to the DCM. If the PAM determines that the detected output power is consistent with the target power value, the DCM stores a current gain control value.

The ATT is configured to adjust the gain control value according to a gain adjustment message transmitted by the DCM.

The DCM is configured to transmit the gain adjustment message to the ATT according to the control message.

Optionally, the DCM transmits device information and a gain control value of the remote unit to the extended unit connected to the remote unit. The device information may include, but is not limited to, a Media Access Control (MAC) address or device serial number information.

In practical applications, due to a signal attenuation characteristic of the radio frequency or bundled cable, the farther the distance between the remote unit in the radio frequency subsystem and the extended unit connected thereto, the lower the input power of the remote unit. In this case, the gain control value is smaller. Therefore, a relative distance between the remote unit and the extended unit can be determined by comparing relative magnitude of the gain control value of the remote unit included in the radio frequency subsystem. For example, a radio frequency subsystem in FIG. 1 includes a remote unit 31, a remote unit 32, . . . , and a remote unit 3n, and gain control values respectively corresponding thereto are denoted by A1, A2, . . . , and An. A relationship between the gain control values is A1>A2> . . . >An.

Further, the indoor distribution system further includes a generation unit.

During operation and maintenance of the indoor distribution system, a position of each network element in the indoor distribution system can be quickly located according to a network topology relationship thereof, so as to realize functions such as quick troubleshooting and convenient operation and maintenance. Therefore, after the indoor distribution system is established, there is a need to first acquire a network topology relationship of the indoor distribution system.

In a possible implementation, in a method for acquiring a network topology, deployment information of network elements in the indoor distribution system is recorded one by one, and then a technician manually configures network topology information at a centralized control position.

However, this method leads to a high labor cost. In addition, due to possible errors in manual measurement, the network topology structure obtained does not have high accuracy.

In another scenario, in the above indoor distribution system, for each radio frequency subsystem, a relative positional relationship of the remote units can be determined through the gain control values of the remote units included in the radio frequency subsystem, thereby determining a topology structure of the radio frequency subsystem. A level of each extended unit can be determined stage by stage through interaction between the host unit and the extended unit, thereby determining the network topology structure of the system and reducing the labor cost. In addition, the network topology structure obtained has higher accuracy. Through the network topology structure obtained, position information of each node can be learnt at a host unit, which facilitates quick fault location and reduces the system operation and maintenance cost.

Figure 3:
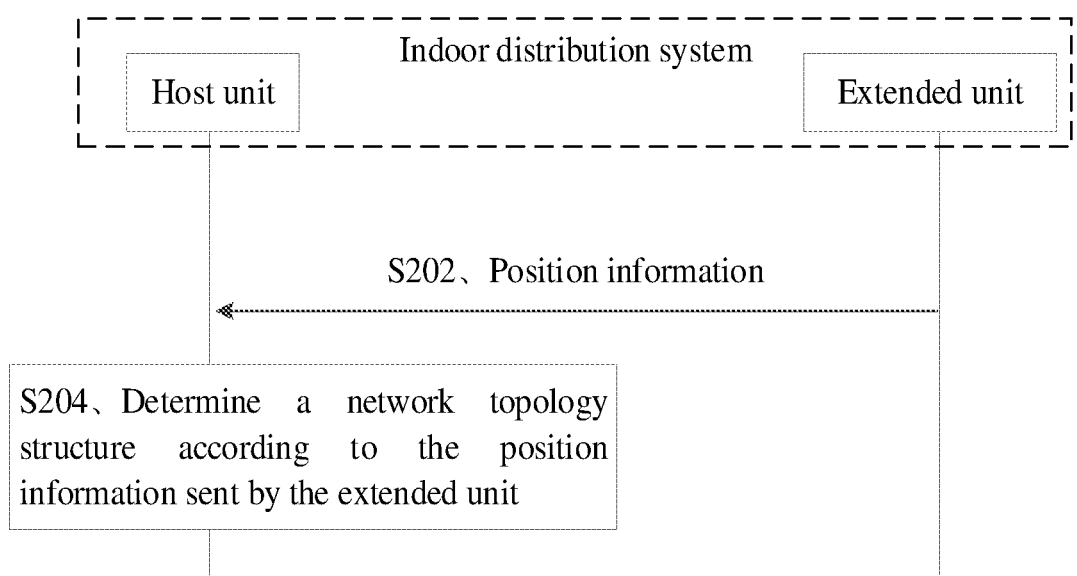
FIG. 3 is a schematic flowchart of a method for acquiring a network topology according to an embodiment of the present disclosure.

FIG. 3 is a schematic flowchart of a method for acquiring a network topology according to an embodiment of the present disclosure. As shown in FIG. 3, the method in this embodiment is performed by an indoor distribution system. The indoor distribution system may be the above indoor distribution system. The method in this embodiment is as follows.

In S202, a host unit receives position information transmitted by each extended unit connected to the host unit.

The position information includes: first-level information respectively corresponding to all extended units on a branch where the extended unit is located, and second-level information respectively corresponding to part or all of the extended units. The second-level information includes gain control values of remote units in the at least one radio frequency subsystem connected to the extended unit.

The extended units connected to the host unit respectively transmit position information to the host unit. The position information is configured for indicating attribute information related to relative positions of all network elements in the branch where the extended unit is located. The network elements include all the extended units in the branch where the extended unit is located and remote units in the radio frequency subsystem connected to the extended unit. Therefore, the host unit receives information of all the network elements in the indoor distribution system except the host unit.

The position information is configured for indicating position-related attribute information of the extended unit and the extended units thereafter. The position information includes first-level information of all the extended units in the branch where the extended unit is located and second-level information respectively corresponding to part or all of the extended units. The above part or all of the extended units are extended units connected with the radio frequency subsystem. In a possible case, all the extended units in the branch where the extended unit is located are each connected with a respective radio frequency subsystem. In another possible case, part of the extended units in the branch where the extended unit is located are each connected with a radio frequency subsystem, while the remaining part of the extended units are not connected with the radio frequency subsystem.

The first-level information may be configured for indicating attribute information of the extended unit and related to a relative position thereof, for example, a level of the extended unit in the branch where the extended unit is located. The level of the extended unit may be levels set for all the extended units in each branch of extended unit connected to the host unit. For example, the level of the extended unit connected to the host unit may be set to a level P1, a following-stage extended unit of the extended unit connected to the host unit may be set to a level P2, and so on.

Optionally, the first-level information may further include device information of the extended unit. The device information may be a serial number, a MAC address, or the like. The device information is not limited in the present disclosure.

The second-level information may be configured for indicating attribute information related to relative positions of the remote units in the radio frequency subsystem. For example, the second-level information may be gain control values respectively corresponding to the remote units in the radio frequency subsystem. The gain control value is configured for indicating that output power can reach target power when the remote unit is at the gain control value.

Optionally, in addition to including the gain control values of the remote units in the at least one radio frequency subsystem connected to the extended unit, the second-level information may further include device information of the remote units. The device information may be a serial number, a MAC address, or the like. The device information is not limited in the present disclosure.

For example, in FIG. 1, the extended unit 22 transmits position information thereof to the host unit 10. The position information may include: first-level information of the extended unit 22, second-level information of the extended unit 22 (gain control values of remote units included in two radio frequency subsystems connected to the extended unit 22), first-level information of the extended unit 21, and second-level information of the extended unit 21 (gain control values respectively corresponding to the remote unit 31, the remote unit 32, . . . , and the remote unit 3n included in the radio frequency subsystem connected to the extended unit 21).

Further, each extended unit in the indoor distribution system stores first-level information and second-level information thereof. In a manner in which the extended unit connected to the host unit acquires position information of the branch where the extended unit is located, the position information of the branch where the extended unit is located can be acquired by reporting stage by stage from a final-stage extended unit.

For example, in FIG. 1, the extended unit 22 acquires the second-level information (the gain control values respectively corresponding to the remote units included in the two radio frequency subsystems respectively connected to the extended unit 22). The extended unit 22 determines position information of the extended unit 22 according to the first-level information and the second-level information. The extended unit 22 transmits the position information of the extended unit 22 to the extended unit 21. The extended unit 21 acquires the second-level information thereof (gain control values respectively corresponding to the remote unit 31, the remote unit 32, . . . , and the remote unit 3n included in the radio frequency subsystem connected to the extended unit 21). The extended unit 21 determines position information of the extended unit 21 according to the position information of the extended unit 22 and the second-level information of the extended unit 21. The extended unit 21 transmits the position information thereof to the host unit 10.

In S204, the host unit determines a network topology structure according to the position information transmitted by each extended unit connected to the host unit.

The host unit receives position information transmitted by all extended units connected thereto, and according to the position information transmitted by each extended unit, respectively determines the network topology of the branch where the extended unit is located, so as to determine the network topology of the indoor distribution system.

Specifically, the host unit stores received port information of each extended unit. For example, the port information may be a serial number starting from 1. Therefore, a network topology structure is determined according to the received position information and corresponding port information transmitted by all the extended units connected thereto.

In this embodiment, the position information transmitted by the extended unit is received through the host unit. The position information includes: the first-level information respectively corresponding to all extended units in the branch where the extended unit is located, and the second-level information respectively corresponding to part or all of the extended units. The second-level information includes the gain control values of the remote units in at least one radio frequency subsystem connected to the extended unit. The host unit receives the first-level information of all network elements in the branch where the extended unit is located respectively transmitted by the extended units connected thereto and the gain control values of the remote units in all radio frequency subsystems. The host unit can determine a topology structure between the extended units according to the first-level information of the extended units, and determine a topology structure of the remote units in each radio frequency subsystem according to the gain control values of the remote units, so as to determine a network topology structure, thereby reducing the labor cost. In addition, the network topology structure obtained by the method provided in this embodiment has higher accuracy. Therefore, position information of each node can be learnt at a host unit, the fault can be quickly located, and the system operation and maintenance cost is reduced.

Figure 4:
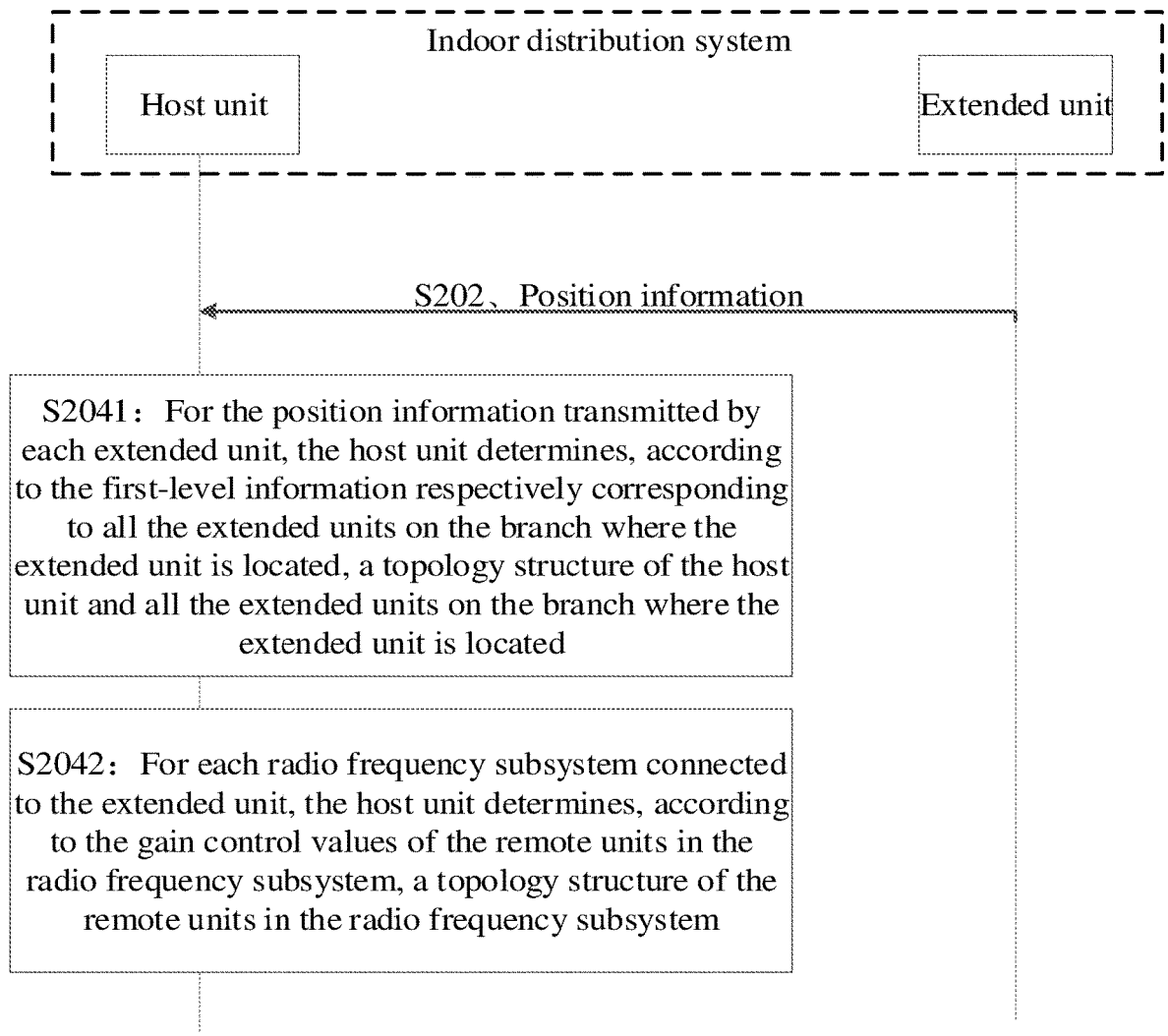
FIG. 4 is a schematic flowchart of another method for acquiring a network topology according to an embodiment of the present disclosure.

FIG. 4 is a schematic flowchart of another method for acquiring a network topology according to an embodiment of the present disclosure. FIG. 4 is based on the embodiment shown in FIG. 3. Further, as shown in FIG. 4, S204 may include the following steps.

In S2041, for the position information transmitted by each extended unit, the host unit determines, according to the first-level information respectively corresponding to all the extended units in the branch where the extended unit is located, a topology structure of the host unit and all the extended units in the branch where the extended unit is located.

The position information transmitted by each extended unit connected to the host unit includes position-related attribute information of all network elements in the branch where the extended unit is located. Therefore, the host unit can determine, according to the position information of each extended unit, a topology structure of the extended units in the branch where the extended unit is located.

Specifically, the topology structure is determined by setting levels. In a topology structure of all extended units on a branch, a level of the extended unit close to the host unit is higher than a level of the extended unit away from the host unit.

For example, in the system shown in FIG. 1, on a branch where the extended unit 21 is located, assuming that the level of the extended unit 21 is 1 and the level of the extended unit 22 is 2 (indicating a subsequent stage of the extended unit 21), a topology structure between the host unit 10, the extended unit 21, and the extended unit 22 is that the host unit 10 is successively connected to the extended unit 21 and the extended unit 22.

In S2042, for each radio frequency subsystem connected to the extended unit, the host unit determines, according to the gain control values of the remote units in the radio frequency subsystem, a topology structure of the remote units in the radio frequency subsystem.

In the topology structure of the remote units, the gain control value of the remote unit close to the extended unit is higher than the gain control value of the remote unit away from the extended unit.

As can be known from the above system embodiments, in each radio frequency subsystem connected to the extended unit, the closer the remote unit is to the extended unit, the larger the gain control value thereof. Therefore, according to gain control values respectively corresponding to all remote units in the radio frequency subsystem, a relative positional relationship of all the remote units can be determined, thereby determining a topology structure of the remote units thereof. For example, the remote unit corresponding to the highest gain control value is connected to the extended unit, and an arrangement order of the remote units respectively corresponding to the gain control values arranged in descending order is the topology structure thereof.

In this embodiment, for the position information transmitted by each extended unit, the host unit determines, according to the first-level information respectively corresponding to all the extended units in the branch where the extended unit is located, a topology structure of the host unit and all the extended units in the branch where the extended unit is located, so as to determine a topology structure between the host unit and the extended unit according to the first-level information. For each radio frequency subsystem connected to the extended unit, the host unit determines, according to the gain control values of the remote units in the radio frequency subsystem, a topology structure of the remote units in the radio frequency subsystem. In the topology structure of the remote units, the gain control value of the remote unit close to the extended unit is higher than the gain control value of the remote unit away from the extended unit. A topology structure inside each radio frequency subsystem connected to the extended unit and with the extended unit is determined. Therefore, a network topology structure of an entire network is determined, reducing the labor cost. In addition, the network topology structure obtained by the method provided in this embodiment has higher accuracy. Therefore, position information of each node can be learnt at a host unit, the fault can be quickly located, and the system operation and maintenance cost is reduced.

On the basis of the above embodiments, the indoor distribution system may include one or two or more than three extended units. Further, prior to S202, the method in this embodiment further includes:

connecting extended units on each branch from a position close to the host unit to a position away from the host unit.

Figure 5:
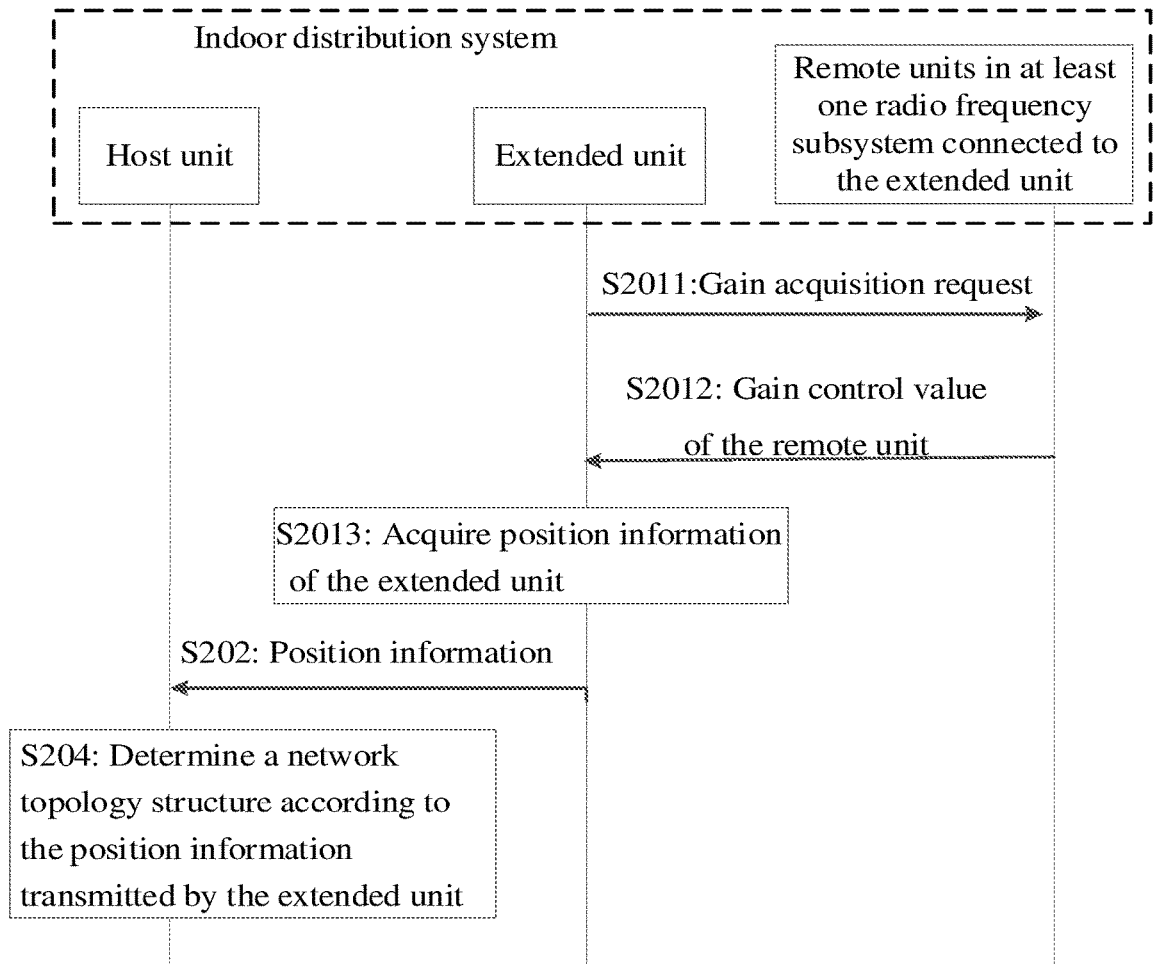
FIG. 5 is a schematic flowchart of yet another method for acquiring a network topology according to an embodiment of the present disclosure.

In a possible implementation, the branch where the extended unit is located includes one extended unit. FIG. 5 is a schematic flowchart of yet another method for acquiring a network topology according to an embodiment of the present disclosure. FIG. 5 is based on the embodiment shown in FIG. 3 or FIG. 4. Further, as shown in FIG. 5, prior to S202, the method provided in this embodiment further includes the following steps.

In S2011, the extended unit transmits gain acquisition requests to the remote units in the at least one radio frequency subsystem connected to the extended unit.

The extended unit transmits the gain acquisition request respectively to all radio frequency subsystems connected thereto. The gain acquisition request is configured for instructing the remote unit to transmit a gain control value of the remote unit to the extended unit.

Figure 6:
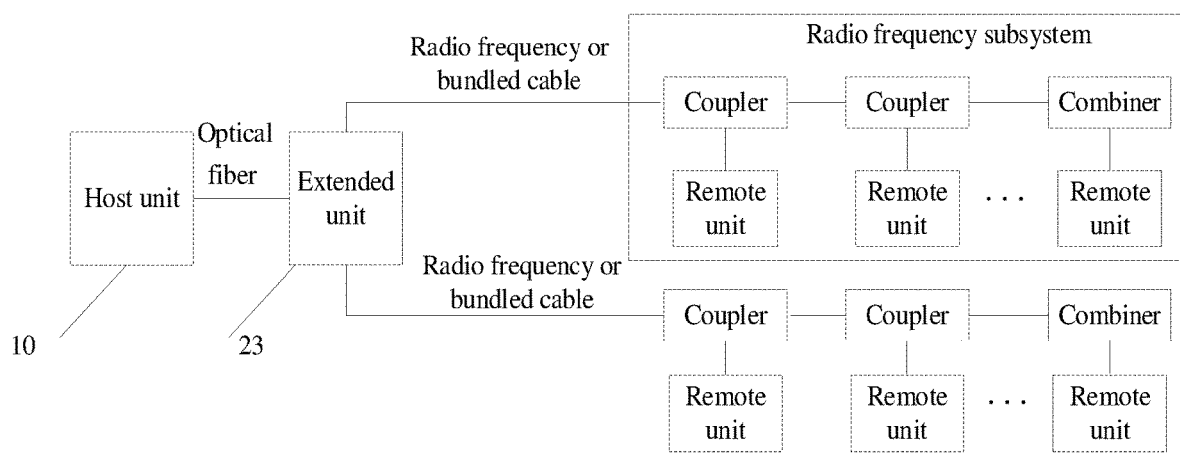
FIG. 6 is a schematic structural diagram of another indoor distribution system according to an embodiment of the present disclosure.

For example, FIG. 6 is a schematic structural diagram of another indoor distribution system according to an embodiment of the present disclosure. As shown in FIG. 6, an extended unit 23 is connected to the host unit 10, the branch on which the extended unit 23 is located includes one extended unit 23, and the extended unit 23 transmits gain acquisition requests respectively to remote units in two radio frequency subsystems connected thereto.

In S2012, each remote unit transmits the gain control value of the remote unit to the extended unit.

For example, as shown in FIG. 6, after receiving the gain acquisition request, each remote unit transmits the gain control value thereof to the extended unit 23 according to the gain acquisition request.

In S2013, the extended unit acquires position information of the extended unit.

The position information includes the first-level information of the extended unit and the gain control values of the remote units in the at least one radio frequency subsystem connected to the extended unit.

For example, as shown in FIG. 6, the extended unit 23 obtains the position information according to the received gain control values (gain control values respectively corresponding to 6 remote units shown in the figure) transmitted by the remote units and its own first-level information (the first-level information thereof is a subsequent stage of the host unit).

In this embodiment, a possible position information acquisition manner is provided when the branch where the extended unit is located includes one extended unit.

Figure 7:
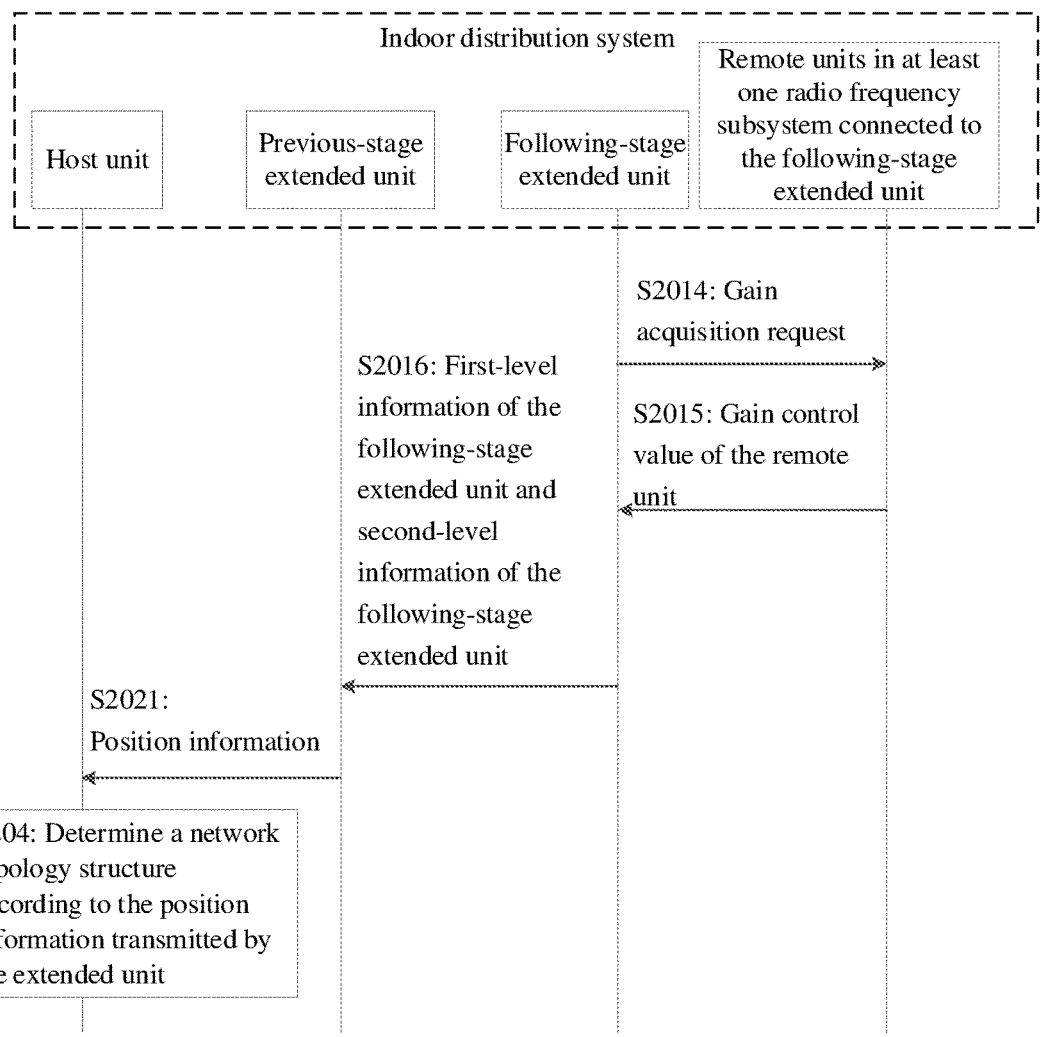
FIG. 7 is a schematic flowchart of still another method for acquiring a network topology according to an embodiment of the present disclosure.

In another possible implementation, FIG. 7 is a schematic flowchart of still another method for acquiring a network topology according to an embodiment of the present disclosure. FIG. 7 is based on the embodiment shown in FIG. 3 or FIG. 4. Further, as shown in FIG. 7, the branch where the extended unit is located includes two extended units, and prior to S202, the method provided in this embodiment further includes S2014, S2015, and S2016.

In S2014, a following-stage extended unit in the two extended units transmits gain acquisition requests to remote units in at least one radio frequency subsystem connected to the following-stage extended unit.

The following-stage extended unit transmits the gain acquisition request respectively to all radio frequency subsystems connected thereto. The gain acquisition request is configured for instructing the remote unit to transmit a gain control value of the remote unit to the extended unit.

Figure 8:
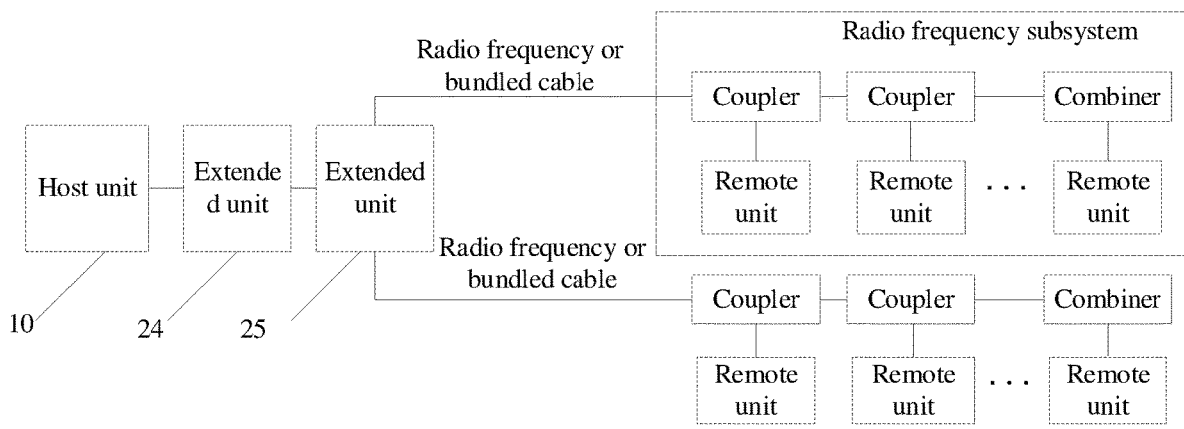
FIG. 8 is a schematic structural diagram of yet another indoor distribution system according to an embodiment of the present disclosure.

For example, FIG. 8 is a schematic structural diagram of yet another indoor distribution system according to an embodiment of the present disclosure. As shown in FIG. 8, an extended unit 24 is connected to the host unit 10, the branch where the extended unit 24 is located includes two extended units which are the extended unit 24 and an extended unit 25 respectively, and the extended unit 25 transmits gain acquisition requests respectively to remote units in two radio frequency subsystems connected thereto.

In S2015, each remote unit in the at least one radio frequency subsystem connected to the following-stage extended unit transmits the gain control value of the remote unit to the following-stage extended unit.

For example, as shown in FIG. 8, after receiving the gain acquisition request, each remote unit transmits the gain control value to the extended unit 25 according to the gain acquisition request.

In S2016, the following-stage extended unit transmits first-level information of the following-stage extended unit and second-level information of the following-stage extended unit to a previous-stage extended unit.

For example, as shown in FIG. 8, the extended unit 25 transmits the received gain control values (gain control values respectively corresponding to 6 remote units shown in the figure) transmitted by the remote units and its own first-level information (the first-level information thereof is next two stages of the host unit) to the extended unit 24.

Correspondingly, S202 may include S2021.

In S2021, the previous-stage extended unit transmits position information to the host unit, the position information including the first-level information of the following-stage extended unit, the second-level information of the following-stage extended unit, and the first-level information of the previous-stage extended unit.

For example, as shown in FIG. 8, the extended unit 24 transmits received information transmitted by the extended unit 25 and its own first-level information (the first-level information thereof is a subsequent stage of the host unit) to the host unit 10.

In this embodiment, a possible position information acquisition manner is provided when the branch where the extended unit is located includes two extended units.

On the basis of the embodiment shown in FIG. 8, further, if the previous-stage extended unit is connected to at least one radio frequency subsystem, the method in this embodiment further includes the following steps.

In S2018, the previous-stage extended unit transmits gain acquisition requests to remote units in at least one radio frequency subsystem connected to the previous-stage extended unit.

The previous-stage extended unit transmits the gain acquisition requests respectively to all radio frequency subsystems connected thereto. The gain acquisition request is configured for instructing the remote unit to transmit a gain control value of the remote unit to the extended unit.

For example, in FIG. 1, the extended unit 21 is the previous-stage extended unit of the extended unit 22, and the extended unit 21 transmits gain acquisition requests to the remote unit 31, the remote unit 32, . . . , and the remote unit 3n included in the radio frequency subsystem connected thereto.

In S2019, each remote unit in the at least one radio frequency subsystem connected to the previous-stage extended unit transmits the gain control value of the remote unit to the previous-stage extended unit.

For example, in FIG. 1, the remote unit 31, the remote unit 32, . . . , and the remote unit 3n respectively transmit gain control values corresponding thereto to the extended unit 21.

Correspondingly, the position information further includes the second-level information of the previous-stage extended unit.

It may be understood that steps S2018 to S2019 and S2014 to S2017 are not performed in sequence, and S2018 to S2019 may be performed first, followed by S2014 to S2017; or S2014 to S2017 may be performed first, followed by S2018 to S2019; or S2018 to S2019 and S2014 to S2017 are performed simultaneously, the sequence of the steps is not limited in the present disclosure.

In this embodiment, a possible position information acquisition manner is provided when the branch where the extended unit is located includes two extended units and the previous-stage extended unit is connected to a radio frequency subsystem.

Figure 9:
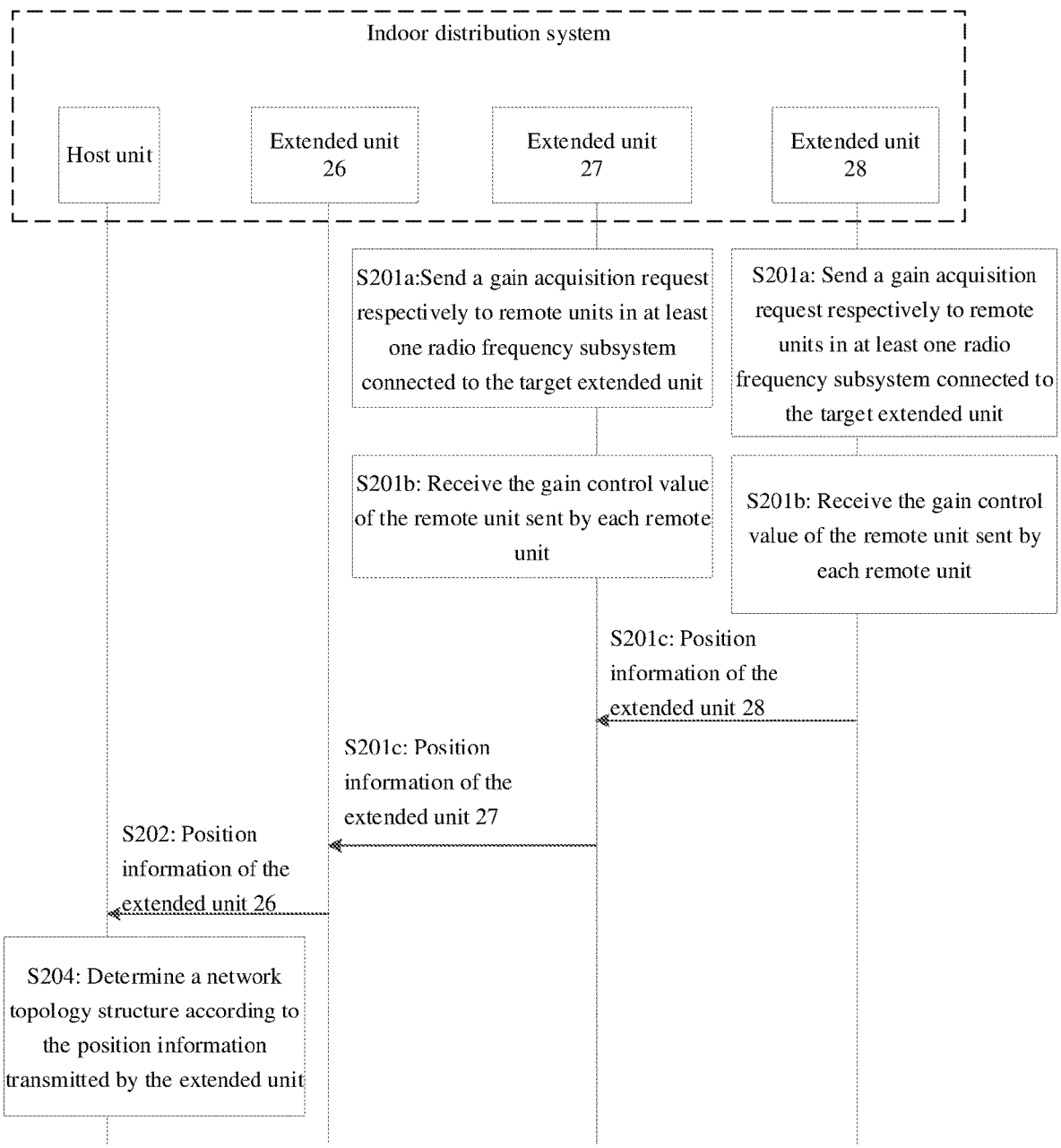
FIG. 9 is a schematic flowchart of another method for acquiring a network topology according to an embodiment of the present disclosure.
Figure 10:
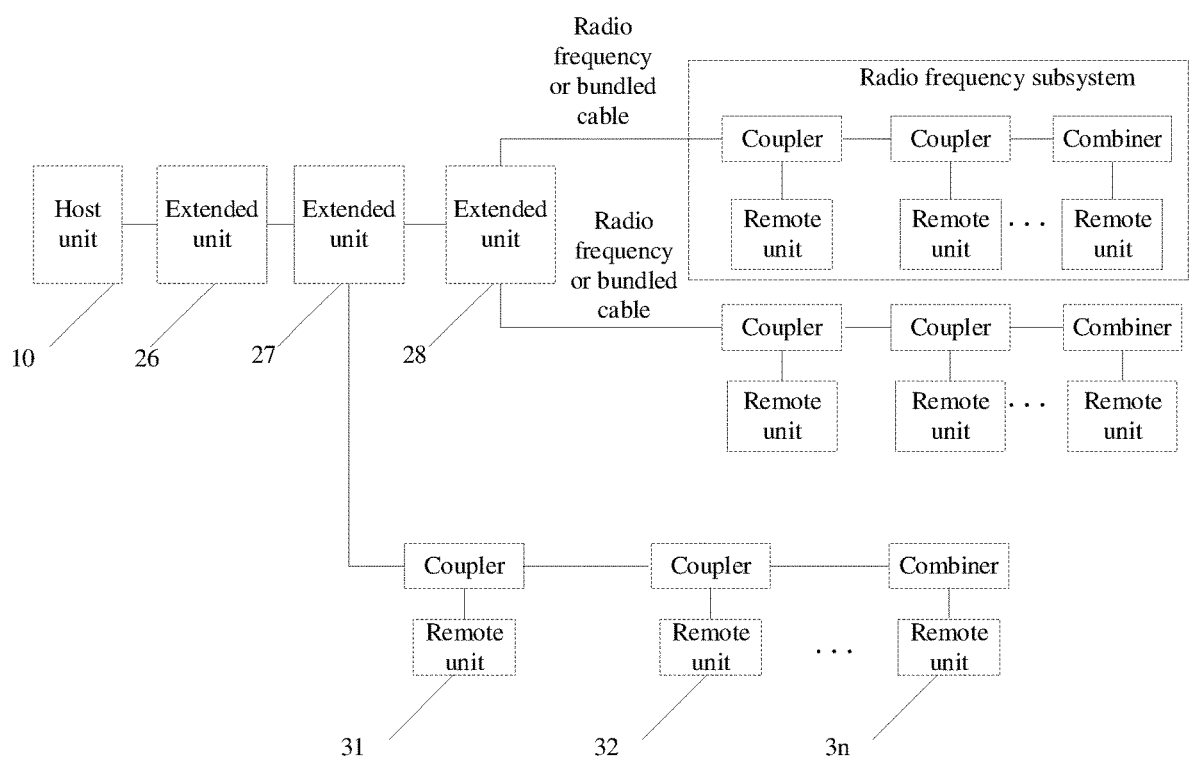
FIG. 10 is a schematic structural diagram of an indoor distribution system according to an embodiment of the present disclosure.

In still another possible implementation, when the branch where the extended unit is located includes at least three extended units, referring to FIG. 9 and FIG. 10 together, a specific implementation process of the method for acquiring a network topology according to the present disclosure is introduced. For ease of description, the extended unit branch exemplary illustrated in FIG. 10 includes three extended units, which are an extended unit 26, an extended unit 27, and an extended unit 28, respectively.

FIG. 9 is a schematic flowchart of another method for acquiring a network topology according to an embodiment of the present disclosure, and FIG. 10 is a schematic structural diagram of an indoor distribution system according to an embodiment of the present disclosure. FIG. 9 is based on the embodiment shown in FIG. 3 or FIG. 4. Further, as shown in FIG. 9, prior to step S202, the method provided in this embodiment further includes the following steps.

In S201a, each target extended unit in the at least three extended units transmits gain acquisition requests respectively to remote units in at least one radio frequency subsystem connected to the target extended unit.

The target extended unit is an extended unit connected to the radio frequency subsystem.

In S201b, each remote unit transmits the gain control value of the remote unit to the target extended unit connected to the remote unit.

Part or all of the at least three extended units are target extended units. If the extended unit is the target extended unit, the gain control values of the remote units in the radio frequency subsystem connected thereto may be acquired. If the extended unit is not the target extended unit, the extended unit is not required to acquire the corresponding gain control value, which means that the gain control value acquired by the extended unit is null.

For example, as shown in FIG. 10, the host unit 10, the extended unit 26, the extended unit 27, and the extended unit 28 are successively connected. The extended unit 27 and the extended unit 28 are each connected to the radio frequency subsystem, and the extended unit 27 and the extended unit 28 are target extended units. The extended unit 27 and the extended unit 28 respectively acquire gain control values transmitted by remote units in the radio frequency subsystems connected thereto.

In S201c, starting from the extended unit of the at least three extended units that is farthest from the host unit, following-stage extended units transmit position information to previous-stage extended units adjacent thereto, until the extended unit of the at least three extended units that is closest to the host unit receives the position information transmitted by the following-stage extended unit thereof.

The position information includes first-level information of the following-stage extended unit and all extended units after the following-stage extended unit, and second-level information of the following-stage extended unit and all target extended units after the following-stage extended unit.

When the branch where the extended unit is located includes at least three extended units, the extended unit adopts a form of reporting stage be stage from the extended unit farthest from the host unit. After receiving position information transmitted by a following-stage extended unit, each extended unit reports the position information together with its own first-level information to a previous-stage extended unit, and finally, all information in the branch is reported to the extended unit closest to the host unit.

For example, as shown in FIG. 10, the extended unit 28 transmits the position information thereof to the extended unit 27. The extended unit 27 transmits gain control values of remote units in the radio frequency subsystem thereof, first-level information of the extended unit 27, and position information of the extended unit 28 to the extended unit 26. Position information of the extended unit 26 includes first-level information of the extended unit 26 and position information of the extended unit 27 (the position information of the extended unit 27 includes the gain control values of the remote units in the radio frequency subsystem, the first-level information of the extended unit 27, and the position information of the extended unit 28).

In this embodiment, a possible position information acquisition manner is provided when the branch where the extended unit is located includes at least three extended units.

On the basis of the above embodiments, further, the position information reported by the extended units may be reported in a form of a table. The table includes a radio frequency port to which the radio frequency subsystem is connected. The following description is based on an example in which the branch of the extended unit includes two extended units. It may be understood that the manner of reporting the position information is not limited to the application to a situation where the branch of the extended unit includes two extended units, and may also be applied to any topology structure, which is not limited in the present disclosure.

Position information of a second-stage extended unit is as shown in Table 1.

TABLE 1

Position information of second-stage extended unit

| Level | Radio frequency port | Device information of remote unit | Gain control value |
|---|---|---|---|
| S2 | P1 | $SN_{S211}/MAC_{S211}$ | $ATT_{S211}$ |
| S2 | P1 | $SN_{S212}/MAC_{S212}$ | $ATT_{S212}$ |
| S2 | ... | ... | ... |
| S2 | P1 | $SN_{S21n}/MAC_{S21n}$ | $ATT_{S21n}$ |
| S2 | P2 | $SN_{S221}/MAC_{S221}$ | $ATT_{S221}$ |
| S2 | P2 | $SN_{S222}/MAC_{S222}$ | $ATT_{S222}$ |
| S2 | ... | ... | ... |
| S2 | P2 | $SN_{S22n}/MAC_{S22n}$ | $ATT_{S22n}$ |

In Table 1, a corresponding relationship between the level of the second-stage extended unit, the radio frequency ports, the device information of the remote unit, and the gain control values is clearly reflected in the table. For example, the information on the first row indicates that the current level of the extended unit is S2, and a gain control value of a remote unit $SN_{S211}/MAC_{S211}$ in the radio frequency subsystem at the radio frequency port P1 corresponding thereto is $ATT_{S211}$.

A first-stage extended unit may obtain its own first-level information as Table 2.

TABLE 2

First-level information of first-stage extended unit

| Level | Radio frequency port | Device information of remote unit | Gain control value |
|---|---|---|---|
| S1 | P1 | SN S111/MAC S111 | ATT S111 |
| S1 | P1 | SN S112/MAC S112 | ATT S112 |
| S1 | ... | ... | ... |
| S1 | P1 | SN S11n/MAC S11n | ATT S11n |
| S1 | P2 | SN S121/MAC S121 | ATT S121 |
| S1 | P2 | $SN_{S122}/MAC_{S122}$ | $ATT_{S122}$ |
| S1 | ... | ... | ... |
| S1 | P2 | $SN_{S12n}/MAC_{S12n}$ | $ATT_{S12n}$ |

The first-stage extended unit transmits the information in Table 2 and the information in Table 1 transmitted by the second-stage extended unit thereafter to the host unit through a port $D_m$ of the host unit.

The host unit generates Table 3 according to Table 1 and Table 2 as follows.

TABLE 3

Table of topology information under port $D_m$ of host unit control

| Port number of host unit | Level | Radio frequency port of extended unit | Device information of remote unit | Gain control value |
|---|---|---|---|---|
| $D_m$ | S1 | P1 | $SN_{S111}/MAC_{S111}$ | $ATT_{S111}$ |
| $D_m$ | S1 | ... | ... | ... |
| $D_m$ | S1 | P2 | $SN_{S121}/MAC_{S121}$ | $ATT_{S121}$ |
| $D_m$ | S1 | ... | ... | ... |
| $D_m$ | S2 | P1 | $SN_{S211}/MAC_{S211}$ | $ATT_{S211}$ |
| $D_m$ | S2 | ... | ... | ... |
| $D_m$ | S2 | P2 | $SN_{S221}/MAC_{S221}$ | $ATT_{S221}$ |
| $D_m$ | S2 | ... | ... | ... |

By analogy, the host unit automatically acquires tables of topology information of branches under each port (refer to Table 3, m=1, 2, 3 . . . ), thereby obtaining a general table of topology information of the network.

Figure 11:
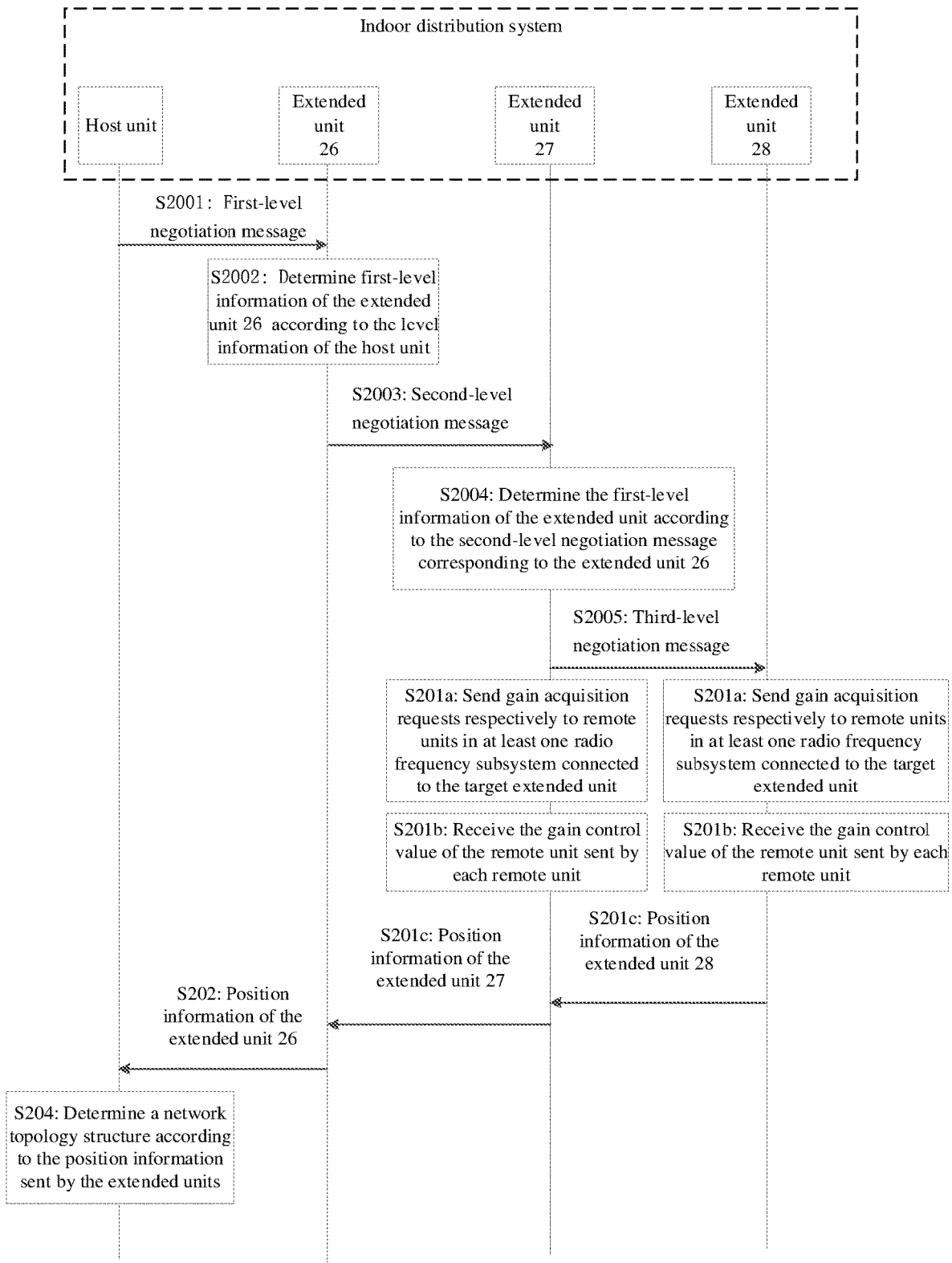
FIG. 11 is a schematic flowchart of another method for acquiring a network topology according to an embodiment of the present disclosure.

FIG. 11 is a schematic flowchart of another method for acquiring a network topology according to an embodiment of the present disclosure. FIG. 11 is based on the above embodiments. Further, as shown in FIG. 11, prior to S202, the method provided in this embodiment further includes:

determining, by the extended unit, corresponding first-level information for each extended unit.

In S2001, the host unit transmits a first-level negotiation message to the extended unit connected to the host unit, the first-level negotiation message including level information of the host unit.

The extended unit connected to the host unit is a following-stage network element of the host unit, and the host unit interacts with the extended unit through a second communication protocol, so that the extended unit connected to the host unit determines its own first-level information.

The second communication protocol may be any communication protocol such as a Transmission Control Protocol (TCP) or a User Datagram Protocol (UDP), the communication protocol is not limited in the present disclosure.

Optionally, the extended unit determines a first port that receives the first-level negotiation message transmitted by the host unit. The extended unit may number all its ports to obtain first port information, and store a corresponding relationship between the first port information and the host unit.

In S2002, the extended unit connected to the host unit determines first-level information of the extended unit according to the level information of the host unit.

In S2003, the extended unit connected to the host unit transmits a second-level negotiation message to a following-stage extended unit.

In S2004, from the following-stage extended unit of the extended unit connected to the host unit, each extended unit determines the first-level information of the extended unit according to the received second-level negotiation message transmitted by a previous-stage extended unit and corresponding to the previous-stage extended unit. The second-level negotiation message includes first-level information of the previous-stage extended unit.

In S2205, the extended unit transmits a third-level negotiation message to the following-stage extended unit, until a final-stage extended unit receives the second-level negotiation message transmitted by a previous-stage extended unit. The third-level negotiation message includes the first-level information of the extended unit.

For example, as shown in FIG. 10, the host unit 10 transmits a first-level negotiation message to the extended unit 26. The extended unit 26 determines a level of the extended unit 26 as a subsequent stage of the host unit, which may be denoted by P1, according to level information of the host unit in the first-level negotiation message and the extended unit 26 transmits a second-level negotiation message to the extended unit 27. The extended unit 27 determines its own level as a subsequent stage of the extended unit 26, which may be denoted by P2, according to the level P1 of the extended unit 26 and the extended unit 27 transmits a second-level negotiation message to the extended unit 28. The extended unit 28 determines its own level as a subsequent stage of the extended unit 27, which may be denoted by P3, according to the level P2 of the extended unit 27.

In this embodiment, through the process of negotiating stage by stage from the host unit to the extended units, each extended unit in the branch can determine its own level, which facilitates subsequent determination of the network topology structure according to the levels.

Figure 12:
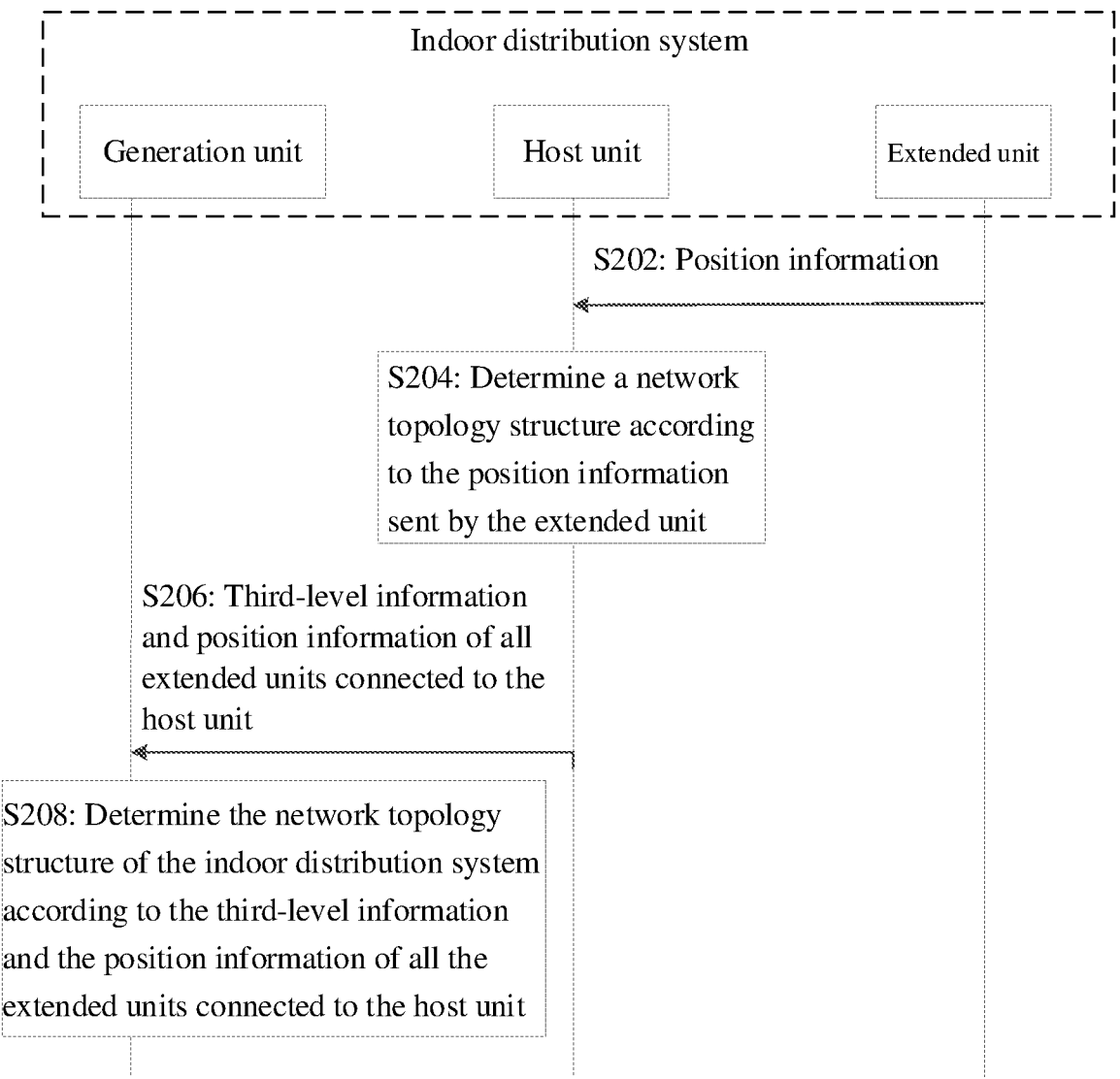
FIG. 12 is a schematic flowchart of another method for acquiring a network topology according to an embodiment of the present disclosure.

FIG. 12 is a schematic flowchart of another method for acquiring a network topology according to an embodiment of the present disclosure. FIG. 12 is based on the above embodiments. Further, as shown in FIG. 12, the indoor distribution system may further include a generation unit. For example, the generation unit may be a network manager. The generation unit is connected to the host unit. The method in this embodiment further includes the following steps.

In S206, the host unit transmits third-level information of the host unit and position information of all extended units connected to the host unit to the generation unit.

The third-level information is information of the host unit, for example, device information and port information of the host unit, etc.

Optionally, when the host unit transmits the position information of all the extended units connected to the host unit, a corresponding relationship between position information of the extended unit connected to a second port of the host unit and information of the second port may also be transmitted to the generation unit.

In S208, the generation unit determines the network topology structure of the indoor distribution system according to the third-level information and the position information of all the extended units connected to the host unit.

An implementation process of determining, by the generation unit, a network topology relationship of the indoor distribution system and a principle thereof are similar to those in step S204. Details are not described herein again.

In this embodiment, the host unit transmits the third-level information and the position information of the extended units connected to the host unit to the generation unit, and the generation unit can determine the network topology relationship of the indoor distribution system according to the above information received.

An embodiment of the present disclosure provides an indoor distribution system, as shown in FIG. 6, including: a host unit 10. The host unit 10 is connected to at least one branch of extended unit, each branch of extended unit includes at least one extended unit 23, and extended units in a same branch of extended unit are successively cascaded. Part or all of the extended units in each branch of extended unit are respectively connected to at least one radio frequency subsystem, and each radio frequency subsystem includes at least one remote unit. The indoor distribution system is configured to implement the method for acquiring a network topology according to any one of the above embodiments.

Further, the indoor distribution system further includes a generation unit. The generation unit is connected to the host unit.

A structure and an implementation principle of the system in this embodiment may be obtained with reference to the embodiments shown in FIG. 1 to FIG. 12 above. Details are not described herein again.

The above are merely specific implementations of the present disclosure, so that those skilled in the art can understand or implement the present disclosure. Various modifications to these embodiments will be readily apparent to those skilled in the art, and the general principles defined herein may be implemented in other embodiments without departing from the spirit or scope of the present disclosure. Therefore, the present disclosure will not be limited to these embodiments herein, but will conform to the broadest scope consistent with the principles and novel features disclosed herein.

INDUSTRIAL APPLICABILITY

In the method for acquiring a network topology provided in the present disclosure, the host unit can determine a topology structure between the extended units according to the first-level information of the extended units, and determine a topology structure of the remote units in each radio frequency subsystem according to the gain control values of the remote units, so as to determine the network topology structure, reducing the labor cost. In addition, through the network topology structure obtained, position information of each node can be learnt at a host unit, the fault can be quickly located, the system operation and maintenance cost is reduced, and industrial applicability is strong.

What is claimed is:

1. A method for acquiring a network topology, the method being applied to an indoor distribution system, the indoor distribution system comprising: a host unit, the host unit being connected to at least one branch of extended unit, each branch of extended unit comprising at least one extended unit, extended units in a same branch of extended unit being successively cascaded, part or all of the extended units in each branch of extended unit being respectively connected to at least one radio frequency subsystem, each radio frequency subsystem comprising at least one remote unit;

the method comprising:
receiving, by the host unit, position information transmitted by each extended unit connected to the host unit, wherein the position information transmitted by each extended unit connected to the host unit comprises: first-level information respectively corresponding to all extended units in a branch where the extended unit connected to the host unit is located, and second-level information respectively corresponding to part or all of the extended units in the branch where the extended unit connected to the host unit is located, the second-level information comprising gain control values of remote units in the at least one radio frequency subsystem connected to the extended units; and
determining, by the host unit, a network topology structure according to the position information transmitted by each extended unit connected to the host unit.

2. The method according to claim 1, wherein the determining, by the host unit, the network topology structure according to the position information transmitted by each extended unit connected to the host unit comprises:
for the position information transmitted by each extended unit connected to the host unit, determining, by the host unit according to the first-level information respectively corresponding to all the extended units in the branch where the extended unit is located, a topology structure of the host unit and all the extended units in the branch where the extended unit connected to the host unit is located; and
for each radio frequency subsystem connected to the extended unit, determining, by the host unit according to the gain control values of the remote units in the radio frequency subsystem, a topology structure of the remote units in the radio frequency subsystem, wherein, in the topology structure of the remote units, the gain control value of the remote unit close to the extended unit connected to the host unit is higher than the gain control value of the remote unit away from the extended unit connected to the host unit.

3. The method according to claim 1, wherein the branch where the extended unit connected to the host unit is located comprises one extended unit, and prior to the receiving, by the host unit, position information transmitted by each extended unit connected to the host unit, the method further comprises:

transmitting, by the extended unit, gain acquisition requests to the remote units in the at least one radio frequency subsystem connected to the extended unit;
transmitting, by each of the remote units, the gain control value of the remote unit to the extended unit; and
acquiring, by the extended unit, position information of the extended unit, the position information comprising the first-level information of the extended unit and the gain control values of the remote units in the at least one radio frequency subsystem connected to the extended unit.

4. The method according to claim 1, wherein the branch where the extended unit connected to the host unit is located comprises two extended units, and prior to the receiving, by the host unit, position information transmitted by each extended unit connected to the host unit, the method further comprises:
transmitting, by a following-stage extended unit in the two extended units, gain acquisition requests to remote units in at least one radio frequency subsystem connected to the following-stage extended unit;
transmitting, by each of the remote units in the at least one radio frequency subsystem connected to the following-stage extended unit, the gain control value of the remote unit to the following-stage extended unit; and
transmitting, by the following-stage extended unit, first-level information of the following-stage extended unit and second-level information of the following-stage extended unit to a previous-stage extended unit; and
correspondingly, the receiving, by the host unit, position information transmitted by each extended unit connected to the host unit comprises:
transmitting, by the previous-stage extended unit, position information to the host unit, the position information comprising: the first-level information of the following-stage extended unit, the second-level information of the following-stage extended unit, and first-level information of the previous-stage extended unit.

5. The method according to claim 4, wherein the method further comprises:
transmitting, by the previous-stage extended unit, gain acquisition requests to remote units in at least one radio frequency subsystem connected to the previous-stage extended unit; and
transmitting, by each of the remote units in the at least one radio frequency subsystem connected to the previous-stage extended unit, the gain control value of the remote unit to the previous-stage extended unit; and
the position information further comprises: second-level information of the previous-stage extended unit.

6. The method according to claim 1, wherein the branch where the extended unit connected to the host unit is located comprises at least three extended units, and prior to the receiving, by the host unit, position information transmitted by each extended unit connected to the host unit, the method further comprises:
transmitting, by each target extended unit in the at least three extended units, gain acquisition requests to remote units in at least one radio frequency subsystem connected to the target extended unit, wherein the target extended unit is the extended unit connected to the radio frequency subsystem;
transmitting, by each of the remote units, the gain control value of the remote unit to the target extended unit connected to the remote unit; and
starting from the extended unit of the at least three extended units that is farthest from the host unit, transmitting, by following-stage extended units, position information to previous-stage extended units adjacent thereto, until the extended unit of the at least three extended units that is closest to the host unit receives the position information transmitted by the following-stage extended unit thereof;

wherein the position information comprises: first-level information of the following-stage extended unit and all extended units after the following-stage extended unit, and second-level information of the following-stage extended unit and all target extended units after the following-stage extended unit.

7. The method according to claim 1, wherein prior to the receiving, by the host unit, position information transmitted by each extended unit connected to the host unit, the method further comprises:

transmitting, by the host unit, a first-level negotiation message to the extended unit connected to the host unit, the first-level negotiation message comprising level information of the host unit;

determining, by the extended unit connected to the host unit, first-level information of the extended unit according to the level information of the host unit;

transmitting, by the extended unit connected to the host unit, a second-level negotiation message to a following-stage extended unit; and starting from the following-stage extended unit of the extended unit connected to the host unit, determining, by each extended unit, the first-level information of the extended unit according to the received second-level negotiation message corresponding to a previous-stage extended unit transmitted by the previous-stage extended unit; wherein the second-level negotiation message comprises first-level information of the previous-stage extended unit; and transmitting, by the extended unit, a third-level negotiation message to the following-stage extended unit, until a final-stage extended unit receives second-level negotiation message transmitted by a previous-stage extended unit; wherein the third-level negotiation message comprises the first-level information of the extended unit.

8. The method according to claim 1, wherein the indoor distribution system further comprises a generation unit, the generation unit being connected to the host unit; and the method further comprises:

transmitting, by the host unit, third-level information of the host unit and position information of all extended units connected to the host unit to the generation unit; and determining, by the generation unit, the network topology structure of the indoor distribution system according to the third-level information and the position information of all extended units connected to the host unit.

9. An indoor distribution system, comprising: a host unit, the host unit being connected to at least one branch of extended unit, each branch of extended unit comprising at least one extended unit, extended units in a same branch extended unit being successively cascaded, part or all of the extended units in each branch of extended unit being respectively connected to at least one radio frequency subsystem, each radio frequency subsystem comprising at least one remote unit; the indoor distribution system being configured to implement a method for acquiring a network topology, wherein the method comprises:

receiving, by the host unit, position information transmitted by each extended unit connected to the host unit, wherein the position information transmitted by each extended unit connected to the host unit comprises: first-level information respectively corresponding to all extended units in a branch where the extended unit connected to the host unit is located, and second-level information respectively corresponding to part or all of the extended units in the branch where the extended unit connected to the host unit is located, the second-level information comprising gain control values of remote units in the at least one radio frequency subsystem connected to the extended units; and determining, by the host unit, a network topology structure according to the position information transmitted by each extended unit connected to the host unit.

10. The system according to claim 9, wherein the indoor distribution system further comprises a generation unit, the generation unit being connected to the host unit; the method further comprises:

transmitting, by the host unit, third-level information of the host unit and position information of all extended units connected to the host unit to the generation unit; and determining, by the generation unit, the network topology structure of the indoor distribution system according to the third-level information and the position information of all extended units connected to the host unit.

11. The indoor distribution system according to claim 9, wherein the determining, by the host unit, the network topology structure according to the position information transmitted by each extended unit connected to the host unit comprises:

for the position information transmitted by each extended unit connected to the host unit, determining, by the host unit according to the first-level information respectively corresponding to all the extended units in the branch where the extended unit is located, a topology structure of the host unit and all the extended units in the branch where the extended unit connected to the host unit is located; and for each radio frequency subsystem connected to the extended unit, determining, by the host unit according to the gain control values of the remote units in the radio frequency subsystem, a topology structure of the remote units in the radio frequency subsystem, wherein, in the topology structure of the remote units, the gain control value of the remote unit close to the extended unit connected to the host unit is higher than the gain control value of the remote unit away from the extended unit connected to the host unit.

12. The indoor distribution system according to claim 9, wherein the branch where the extended unit connected to the host unit is located comprises one extended unit, and prior to the receiving, by the host unit, position information transmitted by each extended unit connected to the host unit, the method further comprises:

transmitting, by the extended unit, gain acquisition requests to the remote units in the at least one radio frequency subsystem connected to the extended unit;

transmitting, by each of the remote units, the gain control value of the remote unit to the extended unit; and acquiring, by the extended unit, position information of the extended unit, the position information comprising the first-level information of the extended unit and the gain control values of the remote units in the at least one radio frequency subsystem connected to the extended unit.

13. The indoor distribution system according to claim 9, wherein the branch where the extended unit connected to the host unit is located comprises two extended units, and prior to the receiving, by the host unit, position information transmitted by each extended unit connected to the host unit, the method further comprises:

transmitting, by a following-stage extended unit in the two extended units, gain acquisition requests to remote units in at least one radio frequency subsystem connected to the following-stage extended unit;

transmitting, by each of the remote units in the at least one radio frequency subsystem connected to the following-stage extended unit, the gain control value of the remote unit to the following-stage extended unit; and transmitting, by the following-stage extended unit, first-level information of the following-stage extended unit and second-level information of the following-stage extended unit to a previous-stage extended unit; and correspondingly, the receiving, by the host unit, position information transmitted by each extended unit connected to the host unit comprises:

transmitting, by the previous-stage extended unit, position information to the host unit, the position information comprising: the first-level information of the following-stage extended unit, the second-level information of the following-stage extended unit, and first-level information of the previous-stage extended unit.

14. The indoor distribution system according to claim 13, wherein the method further comprises:

transmitting, by the previous-stage extended unit, gain acquisition requests to remote units in at least one radio frequency subsystem connected to the previous-stage extended unit; and transmitting, by each of the remote units in the at least one radio frequency subsystem connected to the previous-stage extended unit, the gain control value of the remote unit to the previous-stage extended unit; and the position information further comprises: second-level information of the previous-stage extended unit.

15. The indoor distribution system according to claim 9, wherein the branch where the extended unit connected to the host unit is located comprises at least three extended units, and prior to the receiving, by the host unit, position information transmitted by each extended unit connected to the host unit, the method further comprises:

transmitting, by each target extended unit in the at least three extended units, gain acquisition requests to remote units in at least one radio frequency subsystem connected to the target extended unit, wherein the target extended unit is the extended unit connected to the radio frequency subsystem;

transmitting, by each of the remote units, the gain control value of the remote unit to the target extended unit connected to the remote unit; and starting from the extended unit of the at least three extended units that is farthest from the host unit, transmitting, by following-stage extended units, position information to previous-stage extended units adjacent thereto, until the extended unit of the at least three extended units that is closest to the host unit receives the position information transmitted by the following-stage extended unit thereof;

wherein the position information comprises: first-level information of the following-stage extended unit and all extended units after the following-stage extended unit, and second-level information of the following-stage extended unit and all target extended units after the following-stage extended unit.

16. The indoor distribution system according to claim 9, wherein prior to the receiving, by the host unit, position information transmitted by each extended unit connected to the host unit, the method further comprises:

transmitting, by the host unit, a first-level negotiation message to the extended unit connected to the host unit, the first-level negotiation message comprising level information of the host unit;

determining, by the extended unit connected to the host unit, first-level information of the extended unit according to the level information of the host unit;

transmitting, by the extended unit connected to the host unit, a second-level negotiation message to a following-stage extended unit; and starting from the following-stage extended unit of the extended unit connected to the host unit, determining, by each extended unit, the first-level information of the extended unit according to the received second-level negotiation message corresponding to a previous-stage extended unit transmitted by the previous-stage extended unit; wherein the second-level negotiation message comprises first-level information of the previous-stage extended unit; and transmitting, by the extended unit, a third-level negotiation message to the following-stage extended unit, until a final-stage extended unit receives second-level negotiation message transmitted by a previous-stage extended unit; wherein the third-level negotiation message comprises the first-level information of the extended unit.

* * * * *